May 12, 1964  J. MUTHLER  3,132,541
OVERRUNNING CLUTCH TOOL FEED
Filed May 31, 1962  5 Sheets-Sheet 3

INVENTOR.
JOHN MUTHLER
BY
ATTORNEYS

INVENTOR.
JOHN MUTHLER

ATTORNEYS

United States Patent Office 3,132,541
Patented May 12, 1964

3,132,541
OVERRUNNING CLUTCH TOOL FEED
John Muthler, Royal Oak, Mich.
(11252 E. 9 Mile Road, Warren, Mich.)
Filed May 31, 1962, Ser. No. 201,723
7 Claims. (Cl. 77—5)

The present invention relates to material working machines and more particularly to such a machine especially suitable for deep bore drilling.

In deep bore drilling such as gun barrel drilling and the like it is important that the slide member carrying the drilling or reaming tool moves forward slowly as the tool engages the workpiece. The speed of the slide member which will produce the best results depends upon the type of material being drilled so that it is particularly desirable that some means be provided for regulating this speed. After the tool has penetrated to the desired position the slide member is returned to its starting position at an increased speed. The present invention provides improved means automatically operable to perform these functions while at the same time providing for an infinite variation in the feed rate as well as the return rate.

It is an object of the present invention to provide an improved deep bore drilling and reaming machine by providing means automatically operable to bring the drilling or reaming tool into engagement with a workpiece at a desired speed and means automatically operable upon the tool reaching a desired position of penetration to rapidly return the tool to a starting position at a predetermined increased rate.

It is a further object of the present invention to reduce the manufacturing costs of material working machines of the character described by utilizing a variable speed motor having a double ended shaft in cooperation with a first overrunning clutch to move a tool carrying slide member in one direction at a selected rate and with a second overrunning clutch to move the slide member in an opposite direction at a selected increased rate.

Still further objects and advantages will readily occur to one skilled in the art upon reference to the following drawings in which like characters refer to like parts throughout the several views and in which.

Figure 1:
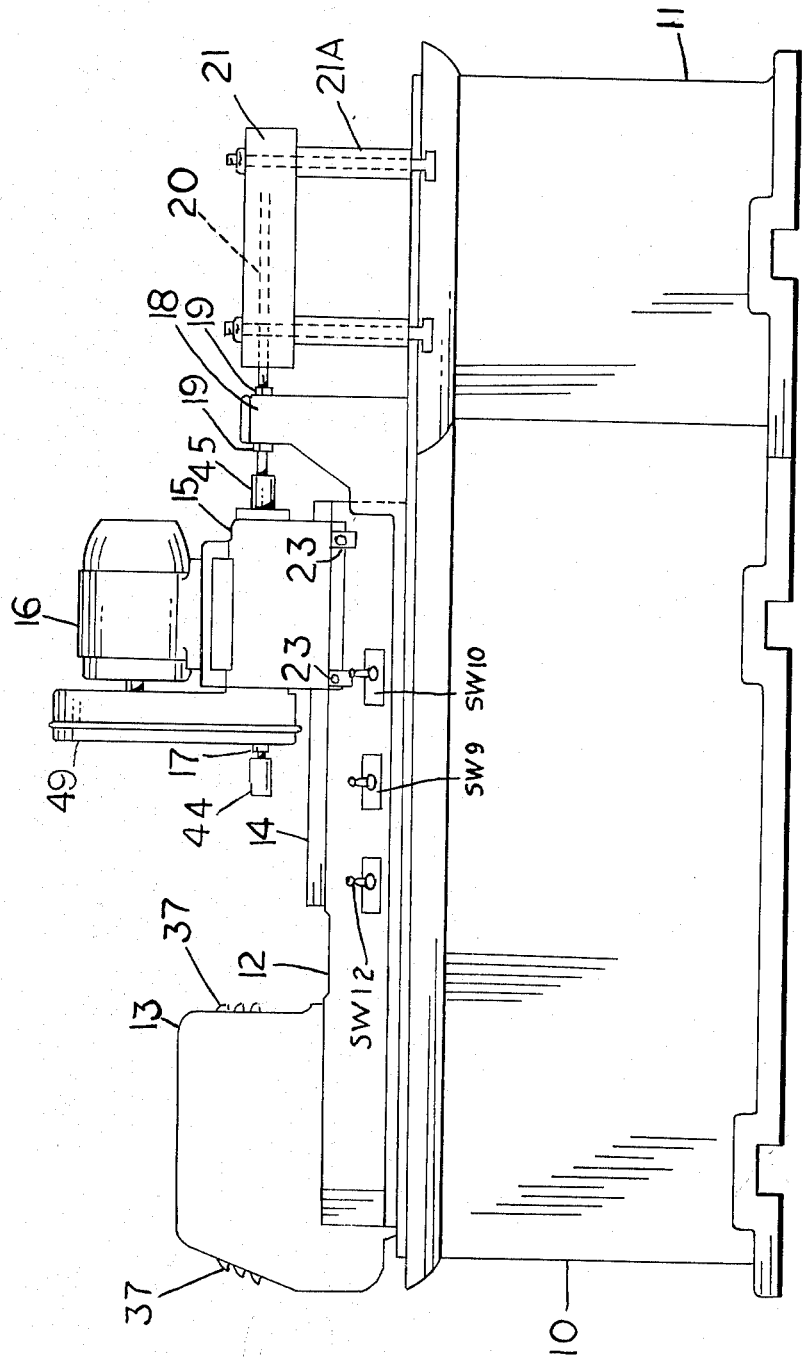
FIG. 1 is a side elevational view of a preferred embodiment of the present invention.

Now referring to the drawings for a more detailed description of the present invention FIG. 1 shows a preferred machine as comprising an elongated machine support 10 and workpiece support 11. A base member 12 is mounted on the upper surface of the machine support 10. A housing 13 is mounted at one end of the base member 12. The base member 12 is preferably provided with a pair of parallel longitudinally extending support members 14 which longitudinally slidingly carry a slide member 15. A variable speed motor 16 is mounted on the slide member 15 and is drivingly connected to a spindle 17. A bushing structure 18 is supported by the machine support 10 and the workpiece support 11 and is provided with bushings 19 aligned with the axis of the spindle 17. A drilling or reaming tool 20 is drivingly carried in the spindle 17 and when slide member 15 is in the position illustrated in FIG. 1 the tool 20 engages a workpiece 21 carried on the workpiece support 10 by a fixture 21A. Contact limit switches SW-9, SW-12 and SW-10 are mounted on the base member 12 to be engaged by adjustably positioned fingers 23 carried on the slide member 15.

Figure 2:
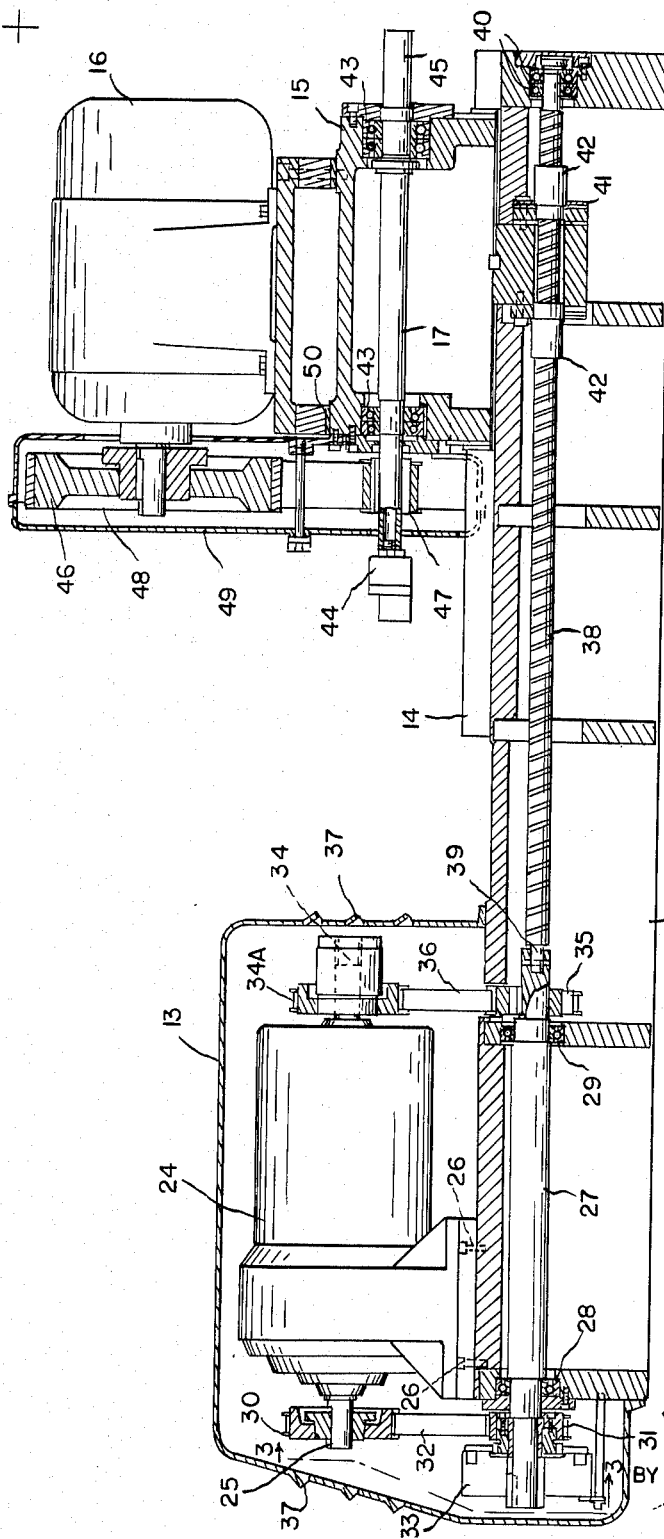
FIG. 2 is a longitudinal cross sectional view of a portion of the structure shown in FIG. 1.
Figure 3:
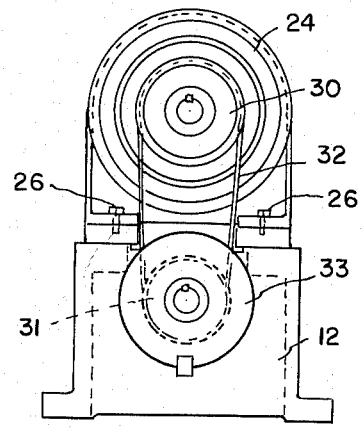
FIG. 3 is an elevational end view taken substantially at line 3—3 of FIG. 2.
Figure 4:
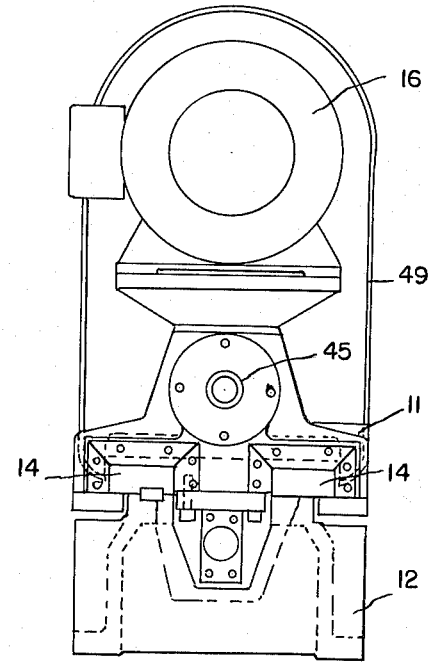
FIG. 4 is an elevational view taken substantially at line 4—4 of FIG. 2.

As can best be seen in FIGS. 2–4, a second variable speed motor 24 is provided with a double ended shaft 25 and is mounted on the base member 12 by bolts 26. A shaft 27 is rotatably carried in the base member 12 by a pair of aligned bearing members 28—29. A pulley 30 is provided on one end of the drive shaft 25 and is drivingly connected by a belt 32 to a pulley 31 carried on the shaft 27. The pulley 31 is mounted to rotate independently of the shaft 27 and is drivingly connected with an overrunning clutch 33 which is in turn keyed to the shaft 27. The overrunning clutch 33 is of a conventional type such as an Alter Sterns Electric Corp. clutch, Model #5.5, style SMR, and imparts rotation to the shaft 27 only when the pulley 31 is rotated in a clockwise direction as seen from FIG. 3.

The other end of the shaft 27 carries a pulley 34a and a second conventional overrunning clutch 34 such as a Curtiss-Wright Clutch type #A-93-8. The pulley 34a is drivingly connected by a belt 36 to a pulley 35 which is keyed to the shaft 27. The pulley 34a is driven by the clutch 34 in a counter clockwise rotation only as seen from the left of FIG. 2.

The motor 24 is of a conventional type and is provided with a gear reduction of 20—1 on the end carrying the pulley 30. The pulleys 30 and 31 are preferably constructed to provide a further 3:1 ratio. The end of the shaft 27 carrying the pulley 34a is not reduced and the pulleys 34a and 34 are preferably in a 1:1 ratio.

The housing 13 covers the motor 24 and is preferably provided with cooling vents 37.

The shaft 27 is drivingly coupled to a lead screw member 38 as at 39. The screw member is rotatably carried in the base member 12 by bearings 40. A mount 41 is secured to the slide member 15 and extends downwardly intermediate the support members 14 and carries a pair of axially aligned internally threaded members 42 which receive the screw member 38. Rotational movement of the lead screw member 38 then produces a longitudinal displacement of the slide member 15 along the support members 14.

The spindle 17 is rotatably mounted in the slide member 15 by bearings 43 and is provided at one end with a coolant union 44 and at the other with a tool retaining fixture 45. The motor 16 is drivingly connected to the spindle 17 by pulleys 46—47 and a belt 48. A housing 49 covers the pulleys 46—47 and the belt 48 and is mounted to the slide member 15 by bolts 50.

Figure 5:
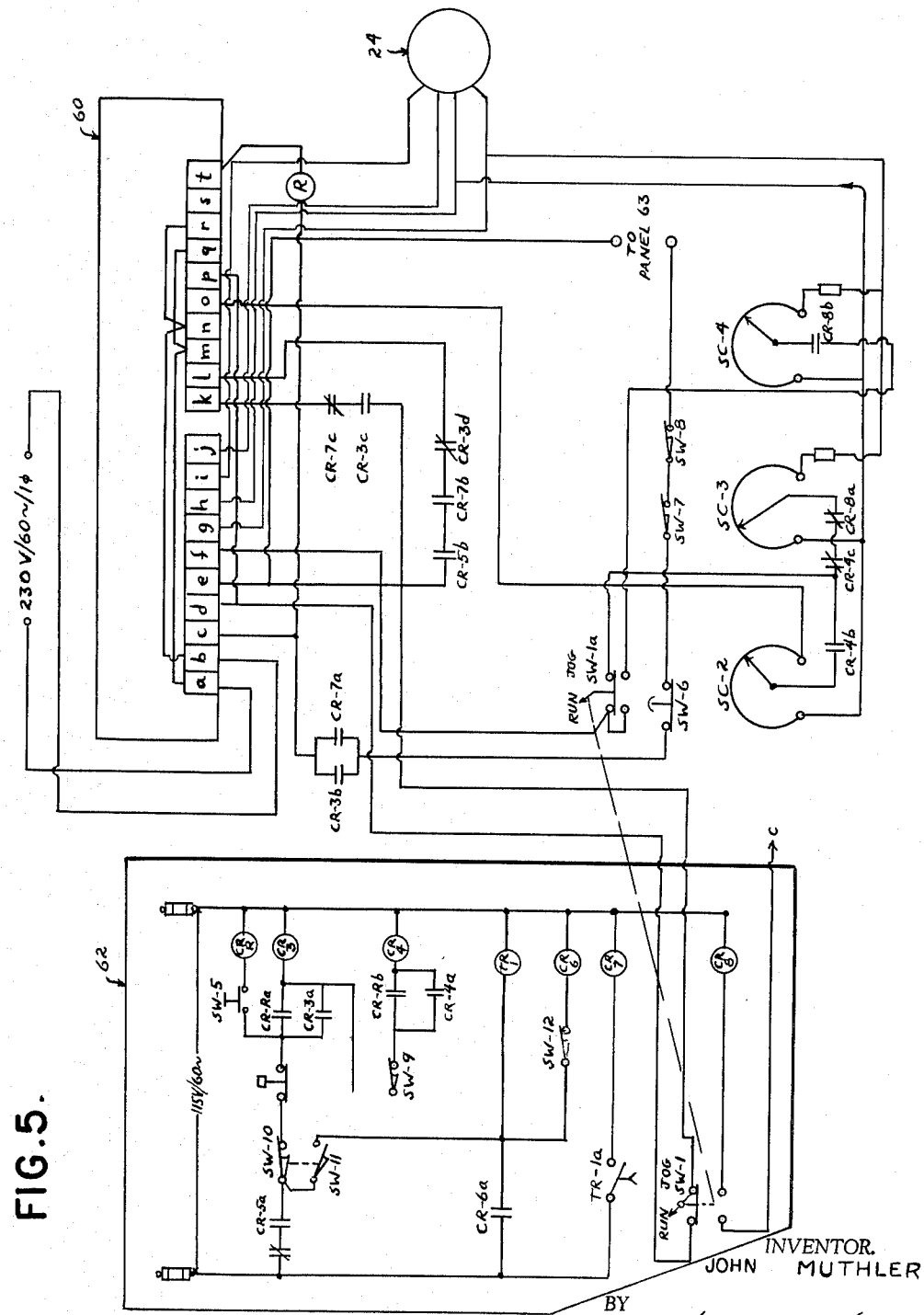
FIG. 5 is an electrical block diagram for the preferred embodiment illustrated in FIGS. 1–4 and FIG. 6 is another electrical block diagram for the preferred embodiment illustrated.
Figure 6:
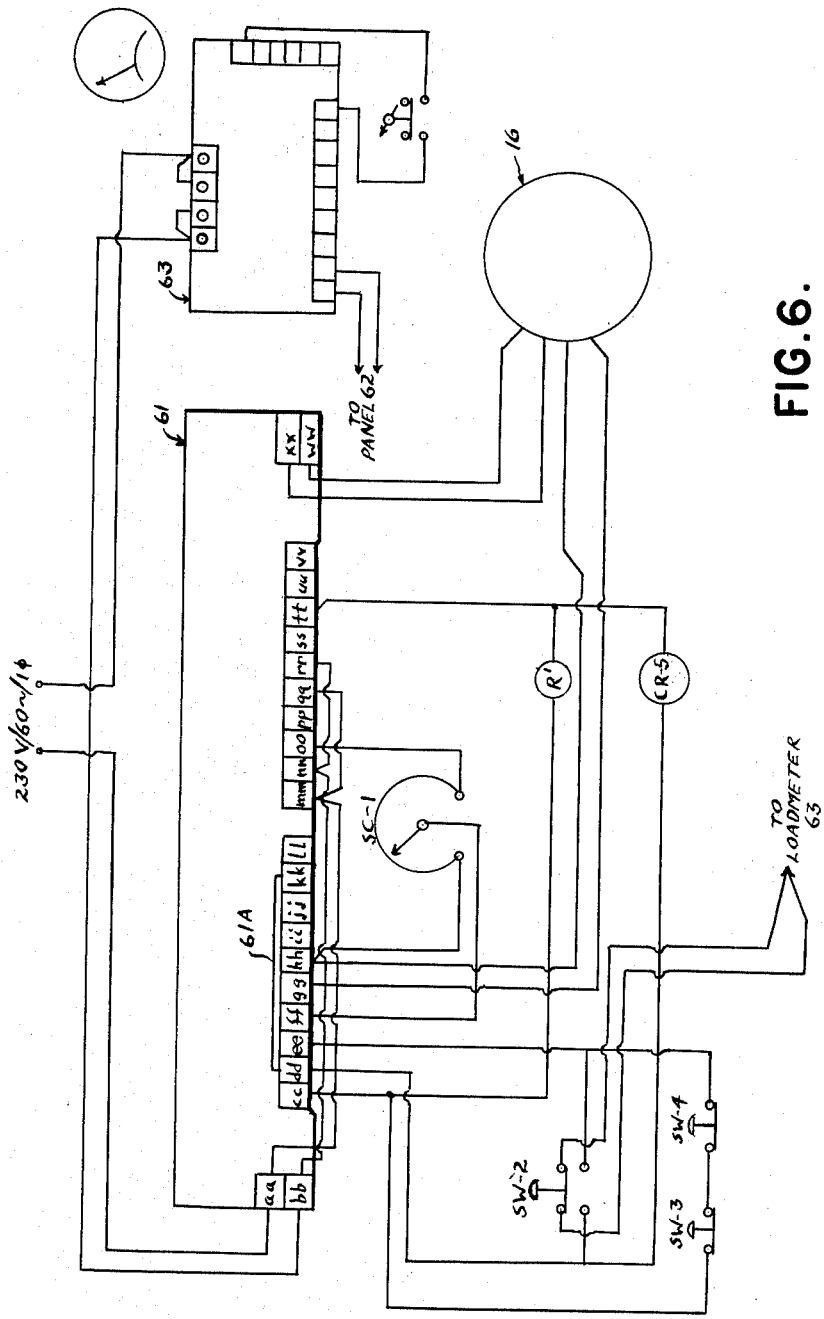

FIGS. 5 and 6 illustrate a preferred control system for operating the feed motor 24 and the spindle drive motor 16, respectively operated by conventional adjustable speed drive control panels 60 and 61 interconnected with each other with a third control panel 62, and with a load-meter 63. For convenience, the inner circuitry of the panels 60, 61 and the loadmeter is omitted, and only terminals are indicated.

On application of line voltage to terminals a, b of panel 60 and terminals aa, bb of panel 51, time delays operate to provide power across terminals c, t and terminals cc, tt respectively, lighting a "feed ready" lamp R and "spindle ready" lamp R', indicating to the operator that the system can be started.

To move the feed unit forward automatically, the "run jog" selector switch SW-1:SW-1a is turned to the "Run" position shown, and the "spindle start" push button SW-2 is pushed, connecting the lower contacts, providing current from terminal cc through normally closed "emergency stop" and "spindle stop" switches SW-3, SW-4, through the switch SW–2 contacts, to terminal *dd* which is connected through jumper 61A to terminal *kk*, energizing a forward control relay in panel 61 enabling the spindle motor 16 to start by providing power to terminals *gg*, *hh*; its speed controlled by rheostat SC–1.

Solenoid CR–5 (FIG. 6) is also energized to close switch CR–5*a* and switch CR–5*b* (FIG. 5). Push button switch SW–5 is momentarily closed to energize solenoid CR–R, closing switches CR–R*a* and CR–*rb*. Solenoid CR–3 is thus energized to close its holding circuit switch CR–3*a*; close switches CR–3*b* and CR–3*c*; and open switch CR–3*d*.

A circuit across terminals *d* and *k* is completed with the closing of switch CR–3*c* to energize the electromagnetic clutch 33 (FIG. 3), and operate the motor 24 in a clockwise rotation as seen from FIG. 3 by providing power to terminals *g* and *h*.

Closing switch CR–R*b* energizes solenoid CR–4 to close its holding circuit switch CR–4*a*; and to close switches CR–4*b* and CR–4*c*, respectively to rapid approach speed control rheostat SC–2 and a feed speed control rheostat SC–3, and the spindle 17 will then be moved by the motor 24, the clutch 33, and the screw 38 rapidly toward the workpiece.

A circuit across terminals *c* and *e* is closed through switch CR–3*b*, a feed stop manual switch SW–6, a reverse overtravel limit switch SW–7, and a forward overtravel limit switch SW–8 to bring in the loadmeter panel 63.

When the rapid approach microswitch SW–9 is tripped open, the solenoid CR–4 is de-energized, and the spindle then progresses forward at normal feeding speed. Near the end of its extended stroke, a depth limit switch SW–10 is opened, de-energizing solenoid CR–3 to open the circuits to the electromagnetic clutch 33. The reverse start limit switch SW–11, ganged to SW–10, is closed, energizing solenoid CR–6 to close switch CR–6*a*, thereby energizing a timer solenoid TR–1. The timer switch TR–1*a* times out and closes after an interval permitting the feed motor 24 to brake to a stop. The solenoid CR–7 is then energized to close switch CR–7*a* continuing the loadmeter circuit; to close switch CR–7*b*; and open switch CR–7*c*. Power from terminal *e* through the closed circuit switches CR–5*b*, CR–7*b* and CR–3*d* to terminal 1 operates a reverse control relay to energize the reversing feed circuit to the motor 24 through terminals *i* and *j* whereby the shaft 25 of the motor 24 will rotate in a counterclockwise direction as seen from FIG. 3.

Rapid reversal is accomplished through the 1:1 ratio drive to the feed screw across the engaged clutch 34. When the spindle is fully retracted, the reverse stop limit switch SW–12 is opened, de-energizing solenoid CR–6, thus returning the system to its initial position in readiness for repeating the above described cycle.

If at any time during forward feed operation the spindle motor develops an overload due to hard metal, dull tool, or the like, the loadmeter 63 responds by stopping the feed motor 24.

For manual intermittent operation of the unit, the run-jog switch SW–1 may be moved to the "jog" position, energizing solenoid CR–8 to open switch CR–8*a* to the feed speed control rheostat SC–3 and to close switch CR–8*b* to a jog speed control rheostat SC–4.

Although I have described but one preferred embodiment of the present invention, it is apparent that many changes and modifications may be made without departing from the spirit of the invention or the scope of the appended claims.

I claim:

1. A material working machine comprising in combination,
   (*a*) an elongated base member provided with a longitudinally extending slide support member,
   (*b*) a slide member longitudinally guided and slidably carried on said slide support member,
   (*c*) a screw rotatably mounted in said base member and extending through a threaded bore in said slide member for moving said slide member in the direction of the rotation axis of said screw upon rotation thereof,
   (*d*) a variable speed motor provided with a double ended drive shaft and mounted on said base member,
   (*e*) a first overrunning clutch operably connecting one end of said drive shaft to said screw for selectively variably moving said slide member in one direction only,
   (*f*) a second overrunning clutch operably connecting the other end of said drive shaft to said screw for selectively variably moving said slide member in a reverse direction only, whereby said screw is drivingly connected with one end of said drive shaft for operation in one direction and with the other end of said drive shaft for operation in the other direction,
   (*g*) means operably carrying a tool on said slide member, and
   (*h*) means positioning a workpiece to be intercepted by said tool during longitudinal movement of said slide member.

2. The machine as defined in claim 1 and in which said tool carrying means comprises
   (*a*) a spindle rotatably mounted on said slide member and operable to carry a tool,
   (*b*) a variable speed motor mounted on said slide member and operably connected to said spindle for rotation thereof.

3. The machine as defined in claim 1 and in which said first overrunning clutch in cooperation with said motor and said screw is operable to move said slide member into a position whereby said tool engages said workpiece and said second overrunning clutch in cooperation with said motor and said screw is operable to move said slide member away from said workpiece and including adjustable means automatically operable to reverse said motor upon said slide member reaching a pair of longitudinally spaced positions.

4. The machine as defined in claim 3 and including adjustable means automatically operable to increase the speed of said motor upon reversal thereof moving said slide member away from said workpiece whereby to provide a rapid retraction of said tool from said workpiece.

5. The device as defined in claim 4 and including adjustable means automatically operable to decrease the speed of said motor upon said slide member when approaching said workpiece reaching a selected position relative thereto.

6. A material working machine comprising in combination,
   (*a*) an elongated base member provided with a longitudinally extending slide support member,
   (*b*) a slide member longitudinally guided and slidably carried on said slide support member,
   (*c*) a screw rotatably mounted in said base member and extending through a threaded bore in said slide member for moving said slide member in the direction of the rotation axis of said screw upon rotation thereof,
   (*d*) a variable speed motor provided with a double ended drive shaft and mounted on said base member,
   (*e*) each end of said drive shaft being provided with a pulley for rotation therewith.
   (*f*) a first overrunning clutch operably connected to one of said pulleys by a driving belt and being operably connected to said screw for rotation thereof in one direction only,
   (*g*) a second overrunning clutch operably connected to the other of said pulleys and operably connected to said screw by a driving belt for rotation thereof in a reverse direction, whereby said screw is drivingly connected with one end of said drive shaft for rotation of said screw in one direction and with the other end of said drive shaft for rotation of said screw in the other direction,
(h) means operably carrying a tool on said slide member, and
(i) means positioning a workpiece to be intercepted by said tool during longitudinal movement of said slide member.

7. The machine as defined in claim 6 and in which said tool carrying means comprises,
(a) a spindle rotatably mounted on said slide member and operable to carry a tool,
(b) a variable speed motor mounted on said slide member and rotatably driving a pulley,
(c) a drive belt drivingly connecting said last mentioned pulley and said spindle.

References Cited in the file of this patent
UNITED STATES PATENTS

| | | |
|---|---|---|
| 2,023,841 | Kingsbury | Dec. 10, 1935 |
| 2,053,398 | Kingsbury | Sept. 8, 1936 |
| 2,903,901 | MacDonald | Sept. 15, 1959 |